United States Patent
Kimura et al.

(10) Patent No.: US 11,651,126 B2
(45) Date of Patent: May 16, 2023

(54) RECOVERY OF A HIERARCHICAL FUNCTIONAL REPRESENTATION OF AN INTEGRATED CIRCUIT

(71) Applicant: Battelle Memorial Institute, Columbus, OH (US)

(72) Inventors: Adam G. Kimura, Westerville, OH (US); Andrew S. Elliott, Columbus, OH (US); Daniel A. Perkins, Lewis Center, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 18 days.

(21) Appl. No.: 17/239,977

(22) Filed: Apr. 26, 2021

(65) Prior Publication Data

US 2021/0240894 A1 Aug. 5, 2021

Related U.S. Application Data

(63) Continuation of application No. 16/897,642, filed on Jun. 10, 2020, now Pat. No. 11,010,519.

(Continued)

(51) Int. Cl.
*G06F 30/00* (2020.01)
*G06F 30/323* (2020.01)
(Continued)

(52) U.S. Cl.
CPC .......... *G06F 30/323* (2020.01); *G06F 30/327* (2020.01); *G06F 30/33* (2020.01); *G06F 2117/06* (2020.01); *H01J 2237/31798* (2013.01)

(58) Field of Classification Search
CPC ...... G06F 30/323; G06F 30/327; G06F 30/33; G06F 2117/06; G06F 2115/06; H01J 2237/31798
See application file for complete search history.

(56) References Cited

U.S. PATENT DOCUMENTS

| | | |
|---|---|---|
| 5,581,738 A | 12/1996 | Dombrowski |
| 5,819,064 A | 10/1998 | Razdan |

(Continued)

OTHER PUBLICATIONS

Benz, et al., "BIL: A tool-chain for bitstream reverse-engineering", Integrated Circuits and Systems Lab, Technische Universitat Darmstadt, Germany, 2012, pp. 735-738.

(Continued)

*Primary Examiner* — Naum Levin
(74) *Attorney, Agent, or Firm* — Lippes Mathias LLP

(57) ABSTRACT

A Register Transfer Level (RTL) representation is recovered from a netlist representing an integrated circuit (IC). The netlist is converted to a graph comprising nodes belonging to a set of node types and edges connecting the nodes. The set of node types includes an instance node type representing an electronic component and a wire node type representing signal transfer between components. The graph is converted to a standardized graph by replacing subgraphs of the graph with standardized subgraphs. An RTL representation of the standardized graph is generated by operations including building signal declarations in a hardware description language (HDL) from the wire nodes of the standardized graph and building signal assignments in the HDL from instance nodes of the standardized graph.

14 Claims, 13 Drawing Sheets

Related U.S. Application Data

(60) Provisional application No. 62/859,466, filed on Jun. 10, 2019.

(51) Int. Cl.
*G06F 30/327* (2020.01)
*G06F 30/33* (2020.01)
*G06F 117/06* (2020.01)

(56) References Cited

U.S. PATENT DOCUMENTS

| | | | |
|---|---|---|---|
| 5,867,395 A | 2/1999 | Watkins et al. | |
| 6,173,435 B1 | 1/2001 | Dupenloup | |
| 6,697,982 B2* | 2/2004 | Chakravarthy | G01R 31/318307 714/738 |
| 7,000,213 B2 | 2/2006 | Banerjee | |
| 7,337,100 B1* | 2/2008 | Hutton | G06F 30/39 716/108 |
| 7,362,135 B1 | 4/2008 | Chang | |
| 7,653,884 B2 | 1/2010 | Furnish | |
| 7,784,005 B1 | 8/2010 | Ng | |
| 7,917,877 B2 | 3/2011 | Singh | |
| 7,937,678 B2* | 5/2011 | Lippmann | G06F 30/327 716/103 |
| 8,037,443 B1* | 10/2011 | Krishnaswamy | G06F 30/327 716/108 |
| 8,156,457 B2 | 4/2012 | Basile | |
| 8,156,458 B2* | 4/2012 | Baker | G06F 30/327 716/132 |
| 8,327,311 B1 | 12/2012 | Neema | |
| 8,347,243 B2 | 1/2013 | Bruneel | |
| 8,484,590 B2 | 7/2013 | Newcomb | |
| 8,612,772 B1* | 12/2013 | Langhammer | G06F 21/76 711/170 |
| 8,661,394 B1 | 2/2014 | Frederick | |
| 8,881,074 B2 | 11/2014 | Faes | |
| 9,047,429 B2 | 6/2015 | He | |
| 9,342,435 B2 | 5/2016 | Van Rozen | |
| 9,355,000 B1 | 5/2016 | Biswas | |
| 9,367,659 B2* | 6/2016 | Saghizadeh | G06F 30/30 |
| 9,430,606 B2* | 8/2016 | Oberai | G06F 30/39 |
| 11,010,519 B2* | 5/2021 | Kimura | G06F 30/327 |
| 11,062,067 B2* | 7/2021 | Hills | G06F 30/398 |
| 2008/0295043 A1 | 11/2008 | Chang et al. | |
| 2009/0031277 A1 | 1/2009 | McElvain et al. | |
| 2009/0313596 A1 | 12/2009 | Lippmann et al. | |
| 2011/0113392 A1 | 5/2011 | Chakraborty et al. | |
| 2015/0100929 A1 | 4/2015 | Redekopp et al. | |
| 2015/0242544 A1 | 8/2015 | Berkovitz et al. | |

OTHER PUBLICATIONS

Ding, et al., "Deriving an NCD file from an FPGA bitstream: Methodology, architecture and evaluation", *Microprocessors and Microsystems*, May 2013, DOI:10.1016/j.micpro.2012.12.003, vol. 37, pp. 299-312.

Note et al., "From the bitstream to the netlist", FPGA '08: Proceedings of the 16th international ACM/SIGDA symposium on Field programmable gate arrays, Feb. 2008.

Yu, et al., "Recent Advances in FPGA Reverse Engineering", *Electronics*, 2018, 7, 246, doi:10.3390/electronics7100246, www/mdpi.com/journal/electronics.

Zhang Tao et al: "A Comprehensive FPGA Reverse Engineering Tool-Chain: From Bitstream to RTL Code", IEEE Access, vol. 7, Feb. 27, 2019 (Feb. 27, 2019), pp. 38379-38389, XP011717579, DOI: 10.1109/ACCESS.2019.2901949 [retrieved on Apr. 1, 2019] abstract p. 38382-p. 38384.

Wenchao Li: "Formal Methods for Reverse Engineering Gate-Level Netlists", Dec. 18, 2013 (Dec. 18, 2013), XP055379711, Retrieved from the Internet: URL:https://www2.eecs.berkeley.edu/Pubs/TechRpts/2013/EECS-2013-222.pdf [retrieved on Sep. 24, 2020] p. 13.

* cited by examiner

```
module counter (
  CLK, OUTPUT
);
input CLK;
output [1 : 0] OUTPUT;
wire CLK_BUFGP;
wire N1;
wire \CLK_BUFGP/IBUFG_2 ;
wire VCC;
wire GND;
wire [1 : 1] Result;
wire [1 : 0] counter;
X_ONE XST_VCC (
  .O(N1)
);
X_FF #(
  .INIT ( 1'b0 ))
counter_1 (
  .CLK(CLK_BUFGP),
  .I(Result[1]),
  .O(counter[1]),
  .CE(VCC),
  .SET(GND),
  .RST(GND)
);
X_LUT2 #(
  .INIT ( 4'h6 ))
\Mcount_counter_xor<1>11 (
  .ADR0(counter[1]),
  .ADR1(counter[0]),
  .O(Result[1])
);
X_BUF OUTPUT_1_OBUF (
  .I(counter[1]),
  .O(OUTPUT[1])
);
X_BUF OUTPUT_0_OBUF (
  .I(counter[0]),
```
```
  .O(OUTPUT[0])
);
X_SFF #(
  .INIT ( 1'b0 ))
counter_0 (
  .CLK(CLK_BUFGP),
  .I(N1),
  .SRST(counter[0]),
  .O(counter[0]),
  .CE(VCC),
  .SET(GND),
  .RST(GND),
  .SSET(GND)
);
X_CKBUF \CLK_BUFGP/BUFG (
  .I(\CLK_BUFGP/IBUFG_2 ),
  .O(CLK_BUFGP)
);
X_CKBUF \CLK_BUFGP/IBUFG (
  .I(CLK),
  .O(\CLK_BUFGP/IBUFG_2 )
);
X_ONE Nlw8lock_counter_VCC (
  .O(VCC)
);
X_ZERO Nlw8lock_counter_GND (
  .O(GND)
);
endmodule
```

2-bit counter netlist — 20₁

```
library IEEE;
use IEEE.STD_LOGIC_1164.ALL;
use IEEE.STD_LOGIC_UNSIGNED.ALL;
entity counter is
Port ( CLK : in STD_LOGIC;
OUTPUT : out STD_LOGIC_VECTOR (1 downto 0));
end counter;
architecture Behavioral of counter is
signal counter : STD_LOGIC_VECTOR(1 downto 0) := (others => '0');
begin OUTPUT <= counter;
count_process: process(CLK)
  begin
  if rising_edge(CLK) then
    counter <= counter + 1;
  end if;
end process;
end Behavioral;
```

2-bit counter RTL — 22

Fig. 3

Set of node types (T) → Input terminal of the netlist (T) → Output terminal of the netlist (K) Constant signal source ($V_{cc}$ or GND)

Wire  (carries a signal)
1 input signal → N output signals where $N \geq 1$, $Sig_{out} = Sig_{in}$ Instance (performs an operation on one or more input signals and drives an output signal)
N input signals → 1 output signal, where $N \geq 1$
Logical gate: AND, OR, NOT, XOR, XNOR,...
LUT (Look-Up Table)
Buffer
FF (Flip-Flop)

Fig. 5

Two-terminal logic gate 32-bit single precision Floating Point Unit (FPU) from RISC Processor
5 stage pipeline

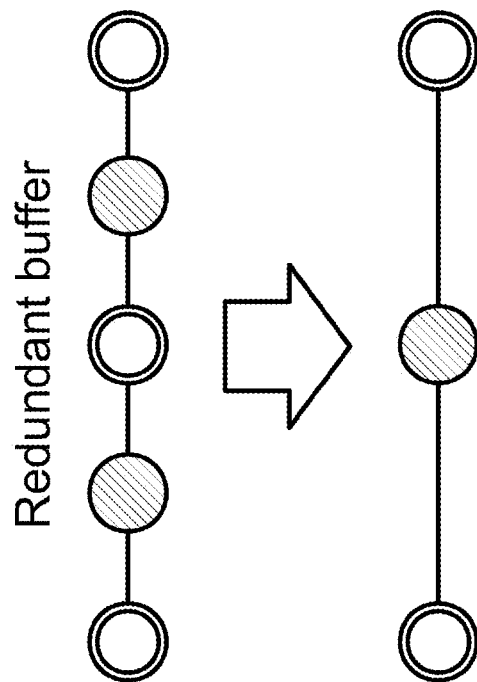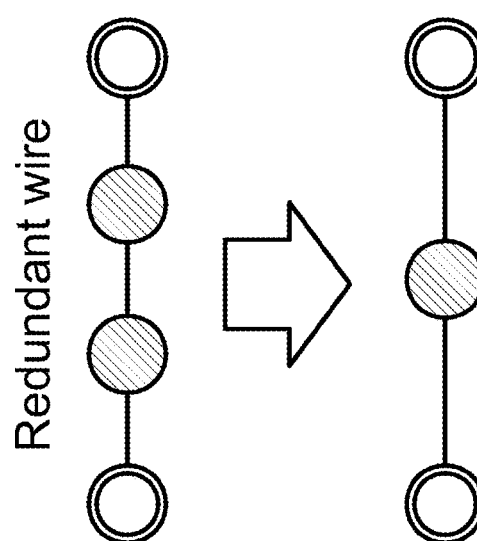
Fig. 8

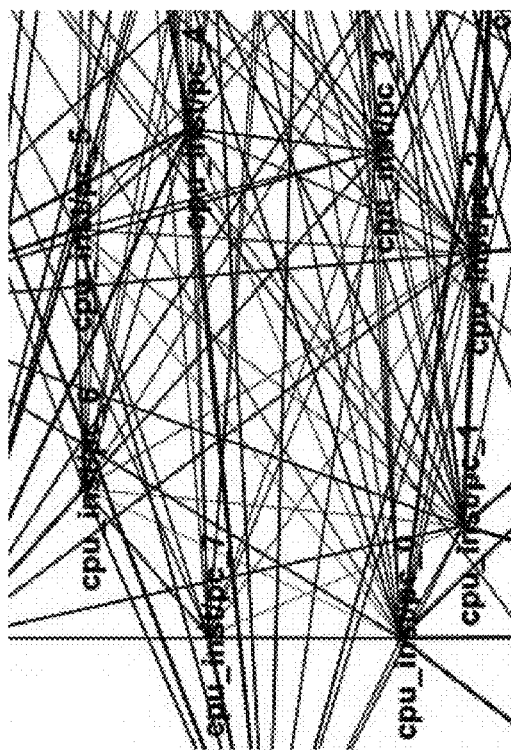
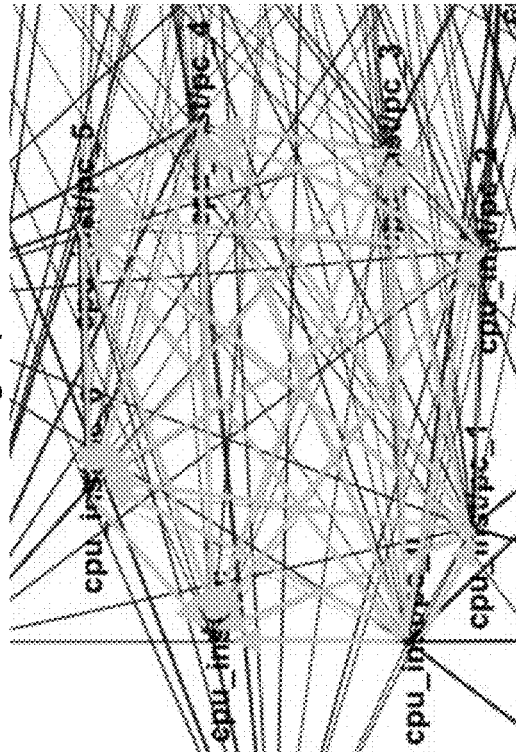
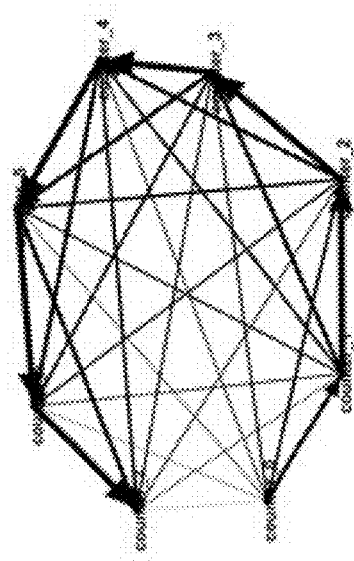
Fig. 11

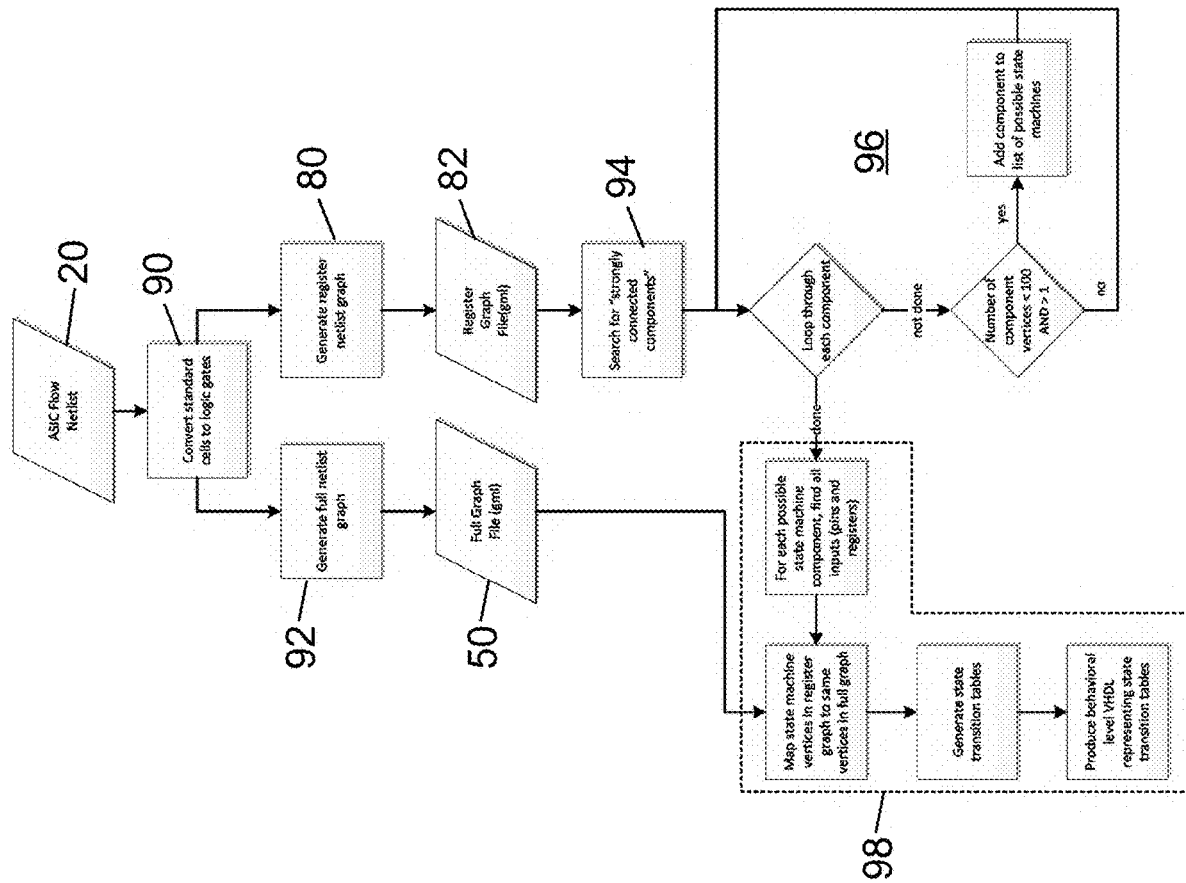

RECOVERY OF A HIERARCHICAL FUNCTIONAL REPRESENTATION OF AN INTEGRATED CIRCUIT

This application is a continuation of U.S. application Ser. No. 16/897,642 filed Jun. 10, 2020 and titled "BEHAVIORAL DESIGN RECOVERY FROM FLATTENED NETLIST", now issued as U.S. Pat. No. 11,010,519, which claims the benefit of U.S. Provisional Application No. 62/859,466 filed Jun. 10, 2019 and titled "BEHAVIORAL DESIGN RECOVERY FROM FLATTENED NETLIST". U.S. application Ser. No. 16/897,642 filed Jun. 10, 2020 is incorporated herein by reference in its entirety. U.S. Provisional Application No. 62/859,466 filed Jun. 10, 2019 is incorporated herein by reference in its entirety.

BACKGROUND

The following relates to the integrated circuit (IC) arts, IC replacement arts, IC hardware trust/assurance arts, IC verification arts, IC reverse engineering arts, applications of the foregoing to Application-Specific Integrated Circuit (ASIC) and/or Field Programmable Gate Array (FPGA) devices, and the like.

In a typical IC design workflow, the design specified at a system level is converted to a Register Transfer Level (RTL) representation expressed in Verilog (standardized as IEEE 1364), SystemVerilog (standardized as IEEE 1800), VHDL, or another hardware description language (HDL). The RTL representation is a hierarchical functional or behavioral representation of the IC logic. The RTL representation is then converted to a gate level representation expressed as a netlist, which is a list of the electronic components in the IC and the connection nodes. In generating the netlist, the hierarchical structure of the RTL is recursively flattened, resulting in a flat netlist that fully captures the content of the hierarchical and behavioral RTL representation. The physical layout of the electronic components and their interconnects as set forth in the netlist is then designed to enable fabrication of the IC. This conversion depends upon the type of IC: in the case of an ASIC, the electronic components are directly fabricated, whereas in an FPGA the electronic components are implemented by way of configuring an array of configurable logic blocks and programming the interconnects between the logic blocks. The logic blocks of the FPGA typically include look-up tables (LUTs), flip-flops (FFs), multiplexors, and other electronic components. An IC fabrication task can be outsourced by supplying either the RTL or the netlist. Providing the netlist is usually considered to be more secure, as it is difficult or impossible to reverse engineer the functional behavior of the IC given only the netlist representation.

However, there can be legitimate reasons to desire to recover the functional behavioral representation of an IC (that is, to recover the RTL representation). In one situation, an IC serving as a component of a system becomes obsolete or otherwise unavailable and needs to be re-fabricated. In another situation, an entity may need hardware assurance, that is, develop trust that an IC component performs as intended with no malicious behavior. In this situation, RTL recovery allows advanced verification and validation techniques to be applied to establish high confidence in the hardware prior to insertion into a critical system.

Certain improvements are disclosed herein.

BRIEF SUMMARY

In accordance with some illustrative embodiments disclosed herein, a non-transitory storage medium stores instructions which are readable and executable by an electronic processor to perform a Register Transfer Level (RTL) representation recovery method. The instructions include: instructions readable and executable by the electronic processor to convert a netlist representing an integrated circuit (IC) design to a graph comprising nodes belonging to a set of node types and edges connecting the nodes, wherein the set of node types includes an instance node type representing an electronic component and a wire node type representing signal transfer between components; instructions readable and executable by the electronic processor to convert the graph to a standardized graph by replacing subgraphs of the graph with standardized subgraphs; and instructions readable and executable by the electronic processor to generate an RTL representation of the standardized graph by operations including building signal declarations in a hardware description language (HDL) from the wire nodes of the standardized graph and building signal assignments in the HDL from instance nodes of the standardized graph.

In accordance with some illustrative embodiments disclosed herein, a device for recovering an RTL representation from a netlist representing an IC design is disclosed. This comprises of an electronic processor and a non-transitory storage medium storing instructions readable and executable by the electronic processor to perform an RTL representation recovery method. The instructions include: instructions readable and executable by the electronic processor to convert a netlist representing an IC design to a graph comprising nodes belonging to a set of node types and edges connecting the nodes, wherein the set of node types includes an instance node type representing an electronic component and a wire node type having a single input signal and one or more output signals with the value of each output signal being equal to the value of the single input signal; instructions readable and executable by the electronic processor to convert the graph to a standardized graph by replacing subgraphs of the graph with standardized subgraphs; and instructions readable and executable by the electronic processor to generate an RTL representation of the standardized graph.

BRIEF DESCRIPTION OF THE DRAWINGS

Any quantitative dimensions shown in the drawing are to be understood as non-limiting illustrative examples. Unless otherwise indicated, the drawings are not to scale; if any aspect of the drawings is indicated as being to scale, the illustrated scale is to be understood as non-limiting illustrative example.

FIGS. 3-13 diagrammatically illustrate embodiments and examples of various operations of the process of FIGS. 1 and 2 as described herein.

DETAILED DESCRIPTION

Figure 1:
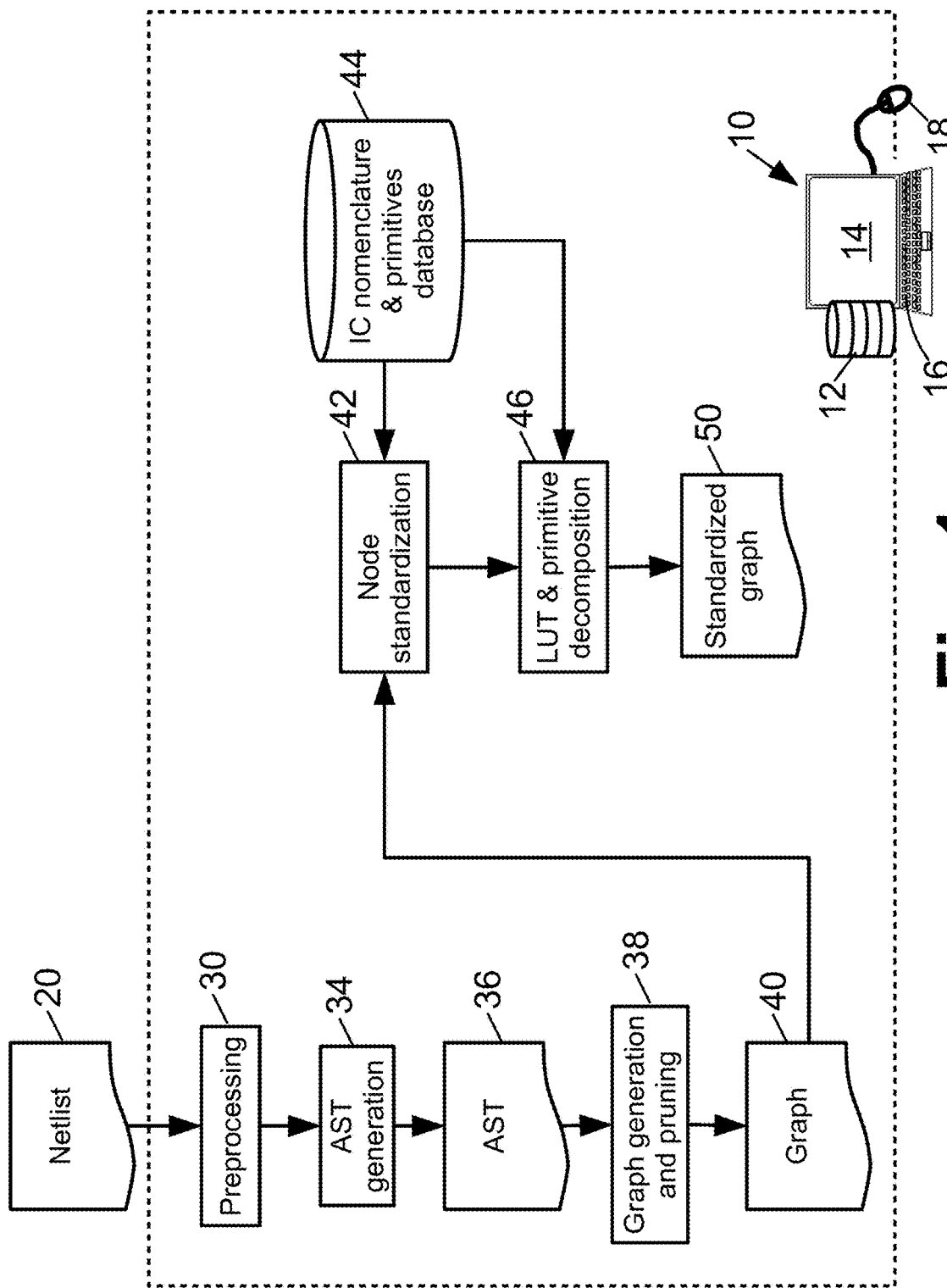
FIGS. 1 and 2 diagrammatically illustrate an apparatus and a process for recovering an RTL representation of an IC from a netlist representation.
Figure 2:
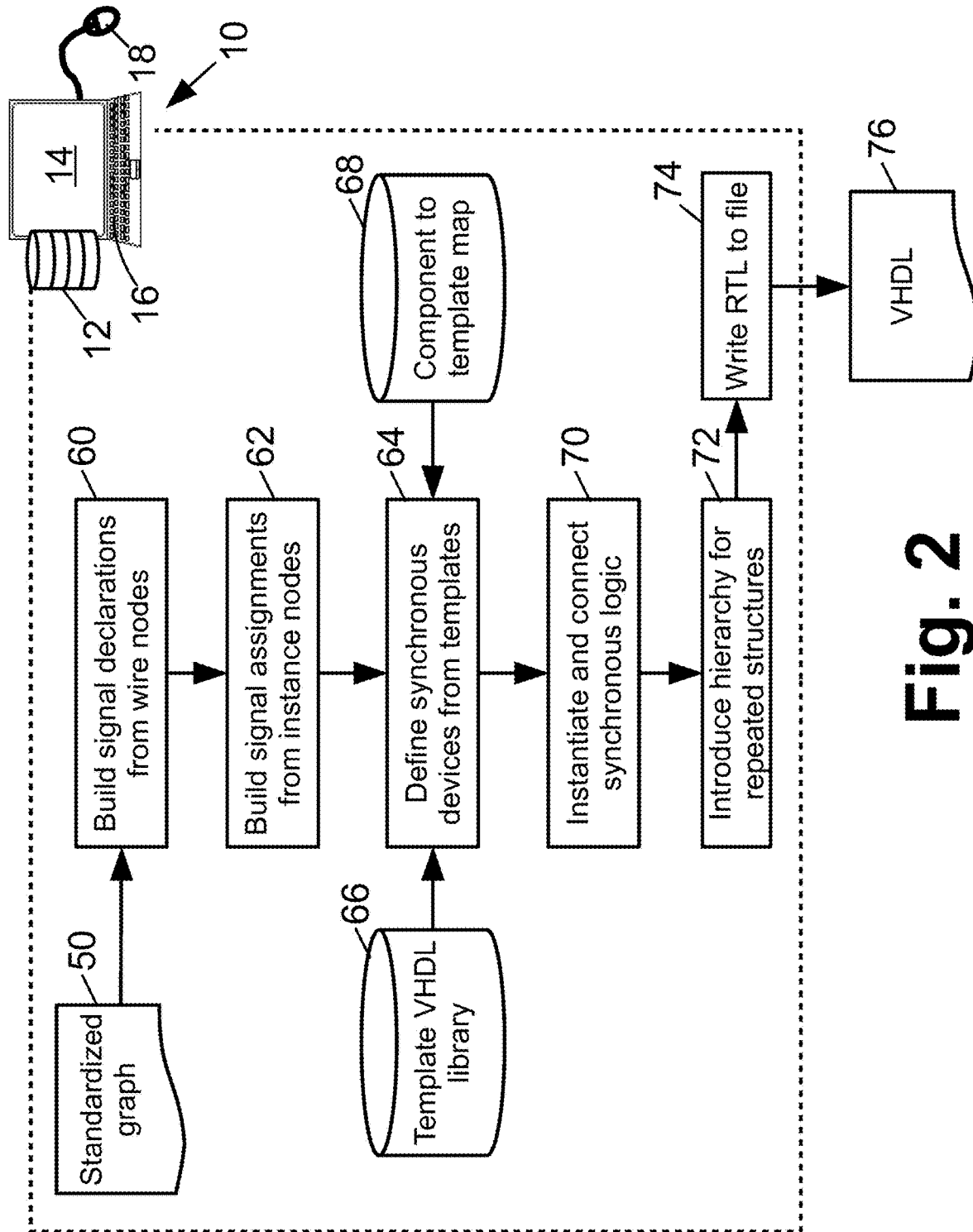

With reference to FIGS. 1 and 2, an electronic processor 10 is programmed by instructions stored on a non-transitory storage medium 12 to perform a Register Transfer Level (RTL) representation recovery method. Said another way, the non-transitory storage medium 12 stores instructions which are readable and executable by the electronic processor 10 to perform the RTL representation recovery method. The illustrative electronic processor 10 comprises a desktop or notebook computer. More generally, the electronic processor 10 may be a desktop computer, server computer, cluster of server computers, cloud computing resource comprising an ad hoc network of computers, or so forth. The non-transitory storage medium may be: a hard disk drive (optionally internal to the computer 10) or other magnetic storage medium; a solid state drive (SSD), flash memory, or other electronic storage medium; an optical disk/drive or other optical storage medium; various combinations thereof, or the like. A display 14 is operatively connected with the electronic processor 10 to display results generated by the RTL representation recovery method. These results may, for example, include a listing of the RTL representation (or a selected portion thereof) in a Hardware Description Language, and/or test results comprising outputs generated by the RTL representation for chosen test inputs. One or more user input devices, such as an illustrative keyboard 16, mouse 18, touch-sensitive overlay of the display 14, various combinations thereof, and/or so forth are provided via which a user interacts with the RTL representation recovery method, for example by operating a graphical user interface (GUI) via which a netlist 20 is provided as input to the RTL representation recovery method (whereby the RTL representation recovery method generates an RTL representation of the netlist) and/or via which the user selects a portion of the RTL representation to view on the display 14 or so forth.

The netlist 20 which serves as input to the RTL representation recovery method may be generated in various ways. In general, it is assumed that the original RTL from which the netlist was generated is unavailable (which is why the RTL representation recovery method is being applied). Rather, in the case of an FPGA the netlist 20 may be reverse engineered based on outputs generated by the FPGA in response to test inputs. See, e.g., Benz et al., "BIL: A Tool-Chain for Bitstream Reverse-Engineering", 22nd International Conference on Field Programmable Logic and Applications (FPL) (Aug. 29-31, 2012); Ding et al., "Deriving an NCD file from an FPGA bitstream: Methodology, architecture and evaluation", Microprocessors and Microsystems vol. 37, pp. 299-312 (2013); Jean-Baptist Note & Eric Rannaud, "From the bitstream to the netlist", in Proc. of the 16th International ACM/SIGDA Symposium on Field Programmable Gate Arrays", Monterey, Calif., Feb. 24-26, 2008. In the case of an ASIC, the netlist 20 may be generated by scanning electron microscope (SEM) imaging and/or other forensic analysis of the ASIC, optionally along with analysis of outputs generated by the ASIC in response to test inputs. The netlist 20 is typically a flat netlist without a hierarchy.

With brief reference to FIG. 3, an illustrative netlist $20_1$ for a 2-bit counter is shown, along with a corresponding RTL representation 22. As seen in FIG. 3, the netlist is a text file that lists electronic components and their connections. It is a flat list, with no hierarchy, and provides no information about component functionality. It only contains the connectivity of the most primitive and fundamental circuit blocks (e.g. NAND, NOR, INV, DFF, etc. gates) The RTL representation is also a text file, in a HDL, specifically employing the IEEE 1164 VHDL standard in the illustrative RTL 22. The RTL representation is a high level hierarchical functional description.

With reference back to FIG. 1, the RTL representation recovery method starts with text parsing and pruning operations 30 to pre-process the netlist 20. This may entail, for example, removing comments, headers, and other extraneous information in the netlist 20. The preprocessing resolves any portions that would not be recognized as syntactically valid Verilog (or other employed HDL). Some manual preprocessing of the netlist is contemplated.

Figure 4:
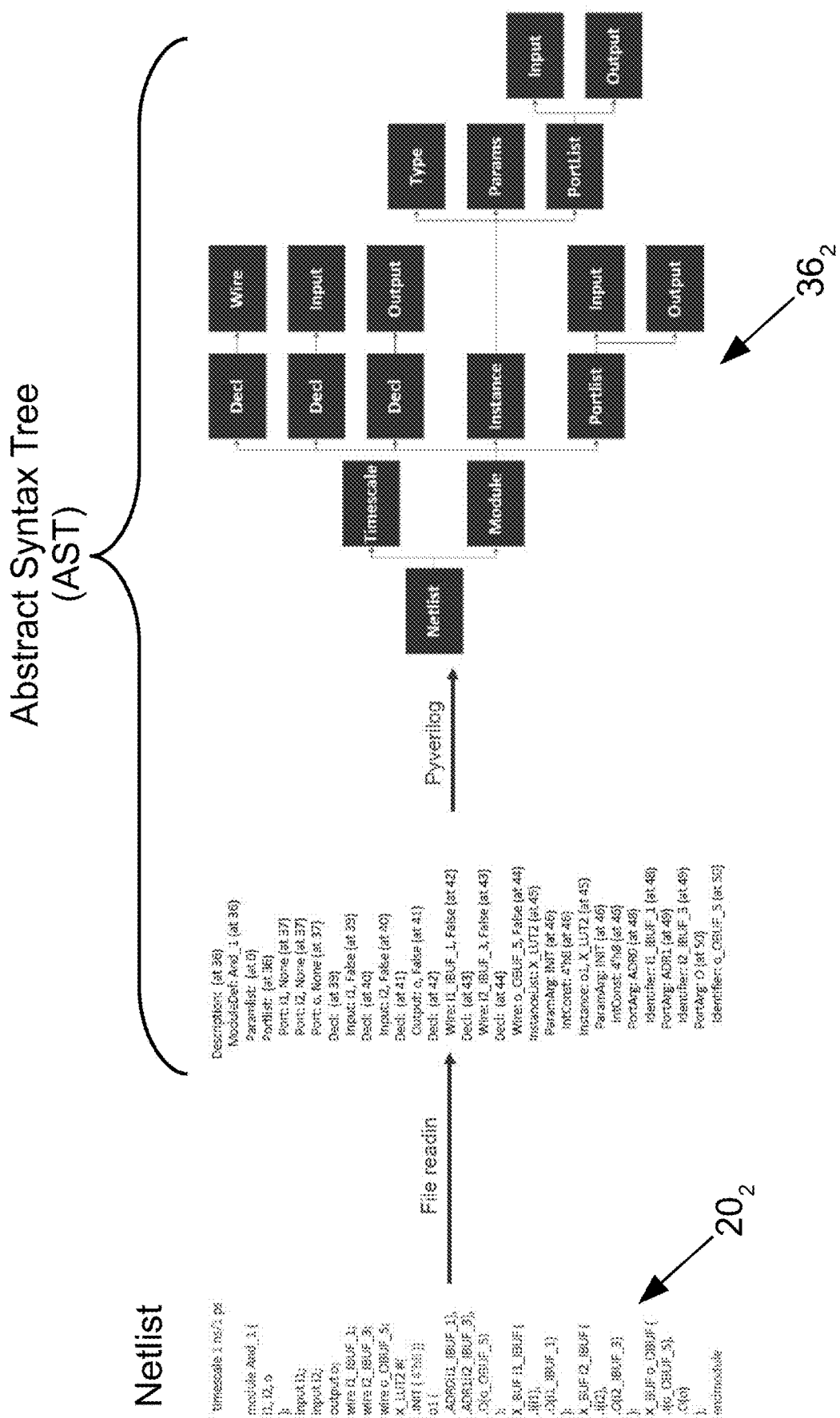

With continuing reference to FIG. 1 and further reference to FIGS. 4 and 5, the preprocessed netlist is then converted into a multi-typed graph. To achieve this, in an operation 34 the preprocessed netlist is converted to an Abstract Syntax Tree (AST) 36. FIG. 4 presents an illustrative example of a preprocessed netlist $20_2$ and corresponding AST $36_2$. In this illustrative example, the root of the AST is the "Netlist" node, from which the "Timescale" and "Module" nodes branch, with the components and their connections being represented by nodes branching off the "Module" node. The AST 36 is then converted in an operation 38 to a multi-typed graph 40. FIG. 5 shows an illustrative typing ontology for the multi-typed graph 40, which includes a set of node types including: an instance node type representing an electronic component; a wire node type representing signal transfer between components; an input node type representing an input terminal of the netlist; an output node type representing an output terminal of the netlist; and a constant node type representing a constant signal source (e.g., $V_{cc}$ or ground, or alternatively logical "1" or logical "0", or another suitable representation of the constant values of a binary system).

The instance node type represents a component that performs an operation on one or more input signals and drives an output signal. Typically, an instance node has one or more input signals and a single output signal (although two or more outputs from a node of the instance node type is also contemplated). For example, an AND gate may be represented by an instance node with two (or more) input signals and a single output signal whose value is the logical AND of the two (or more) input signals. As another example, an instance node representing a buffer has a single input signal and a single output signal whose value is equal to that of the input signal. An instance node representing a LUT has one or more input signals and an output signal corresponding to the output of the LUT for the input signal(s). An instance node representing a flip-flop (FF) has one or more inputs and an output whose value depends on the inputs and on an internal state of the FF.

The wire node type has a single input signal and one or more output signals, with the value of each output signal being equal to the value of the single input signal. The wire node thus efficiently captures the possibility of a signal being fed into multiple other components by way of a single node of the wire node type. In this way, the wire nodes can later be directly converted to signal declarations in the RTL, followed by signal assignments obtained from the wire node connections to instance nodes.

Figure 6:
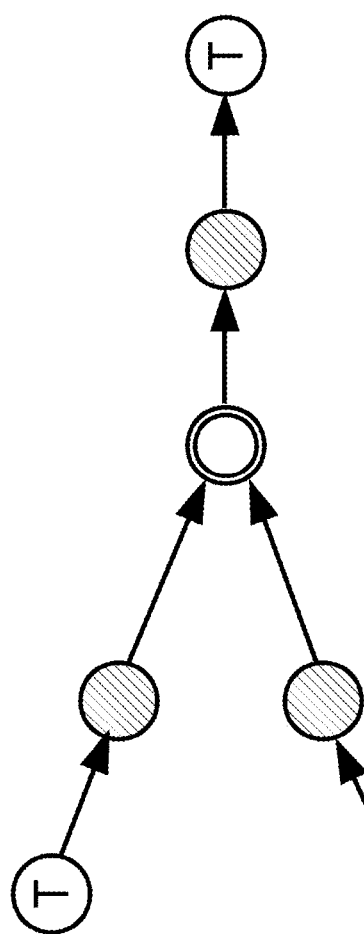
Figure 7:
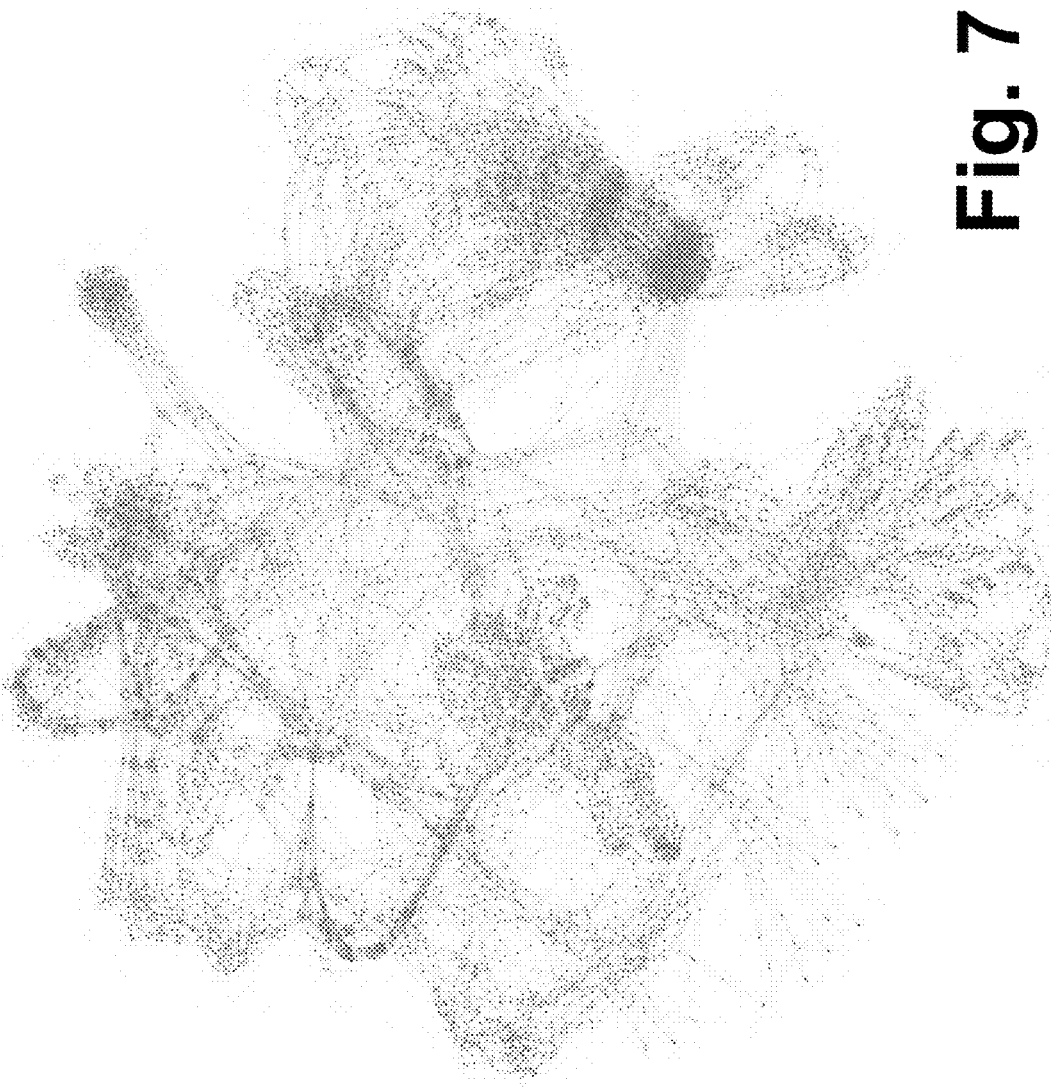

With continuing reference to FIG. 1 and with further reference to FIGS. 6 and 7, in the operation 38, the graph 40 is generated from the AST 36 by stepping through the tree representation and generating lists of node names of the various node types as the AST 36 is traversed. For components and signals designated by standard nomenclature, the directionality of edges connecting nodes of the graph 40 are assigned. However, some nodes or signals may employ manufacture-specific nomenclature such that directionality cannot be determined from the AST 36 alone—these ambiguities will be resolved in the next stage. The AST 36 is a data structure that provides a list of the netlist's components and connections between them in a way that is easily traversable. The graph 40 is created by instantiating each component listed in the AST 36 as a node in the graph and creating connections between these nodes based on connection information from the AST. By way of non-limiting illustrative example, FIG. 6 illustrates a graph for a simple two-input logic gate (e.g., a 2-input AND gate, 2-input OR gate, or so forth). In general, each pair of nodes from the group consisting of instance nodes, terminal nodes, and constant nodes are interconnected by way of an intervening wire node. This, again, facilitates conversion of the wire nodes to RTL signal declarations later in the RTL recovery process. FIG. 7 shows a diagrammatic representation of a graph for a 32-bit single precision Floating Point Unit (FPU) from RISC Processor (5 stage pipeline). The graph of FIG. 7 shows the nodes as points without distinguishing the node type, but illustrates the high degree of complexity of the graph representation of the netlist for a more complex IC design and shows that there is inherent hierarchy that can be observed in the flattened netlist when observed in this way.

With continuing reference to FIG. 1 and with further reference to FIG. 8, the operation 38 preferably further includes graph pruning to remove unused or redundant nodes, such as unconnected devices, buffers, LUTs acting as buffers, double inverters, doubly-connected wires, or so forth. Processing time and graph readability can be improved by such pruning. FIG. 8 illustrates two examples of pruning operations: removal of a redundant wire (left-hand diagram), and removal of a redundant buffer (right-hand diagram).

The resulting graph 40 advantageously captures the components and connections of the netlist 20 in a format that is more readily converted to RTL as described herein. For components and signals designated by standard nomenclature, the directionality of edges connecting nodes of the graph 40 are assigned in the operation 38. However, some nodes or signals may employ manufacture-specific nomenclature (that is, the node and signal nomenclature may be specific to the IC manufacturer). In such cases, directionality cannot be determined at operation 38. Similarly, different manufacturers and device families use different primitives. Functionality of primitives by different manufacturers may be identical, but port information and primitive names typically vary.

Figure 9:
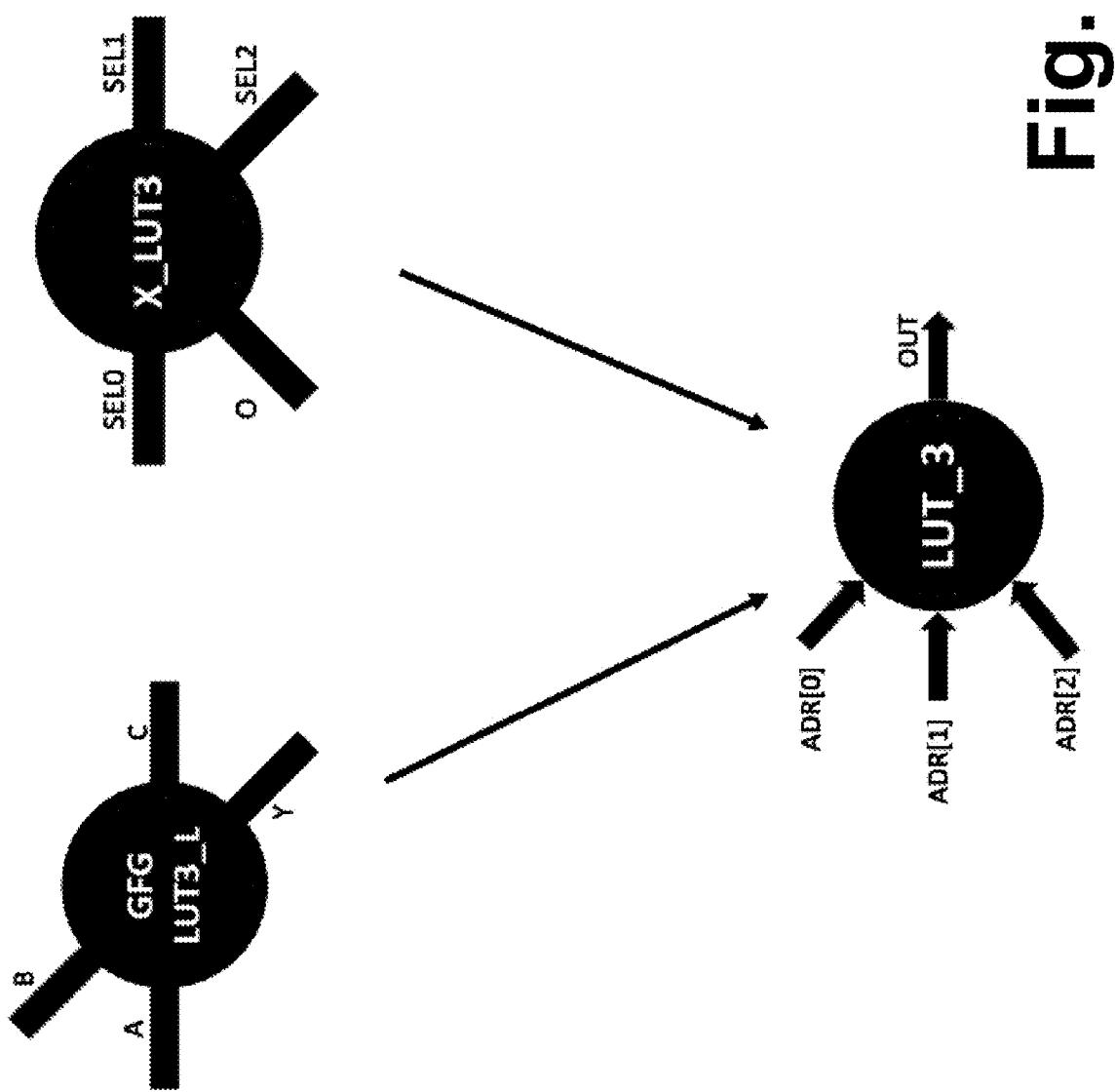

Thus, with continuing reference to FIG. 1 and with further reference to FIG. 9, in an operation 42, node standardization is performed. This entails replacing nodes of the graph 40 with standardized nodes using an IC nomenclature database 44. FIG. 9 shows an example of this operation 42. In general, the nodes may employ manufacturer-specific naming conventions, for which port (and hence graph edge) directionality is unknown, and functionality of the instance nodes is unspecified. This is diagrammatically shown by two examples of nodes with manufacturer-specific nomenclature (top two diagrams of FIG. 9 with node names "GFG LUT3-L" and "X_LUT3" respectively, and manufacturer-specific signal names as shown in the top diagrams of FIG. 9). The IC nomenclature database 44 provides this manufacturer-specific nomenclature so as to resolve these manufacturer-specific node and signal names to standardized names (e.g., the top diagram nodes of FIG. 9 are resolved to the standardized node named "LUT_3", with standardized signal names as shown in the bottom diagram of FIG. 9. Additionally, the resolution of the node "LUT_3" (or more generally, replacement of a manufacture-specific node with an equivalent standardized node) allows the directionality of the node ports to be resolved. Hence, the output of operation 42 is a fully directed graph.

Figure 10:
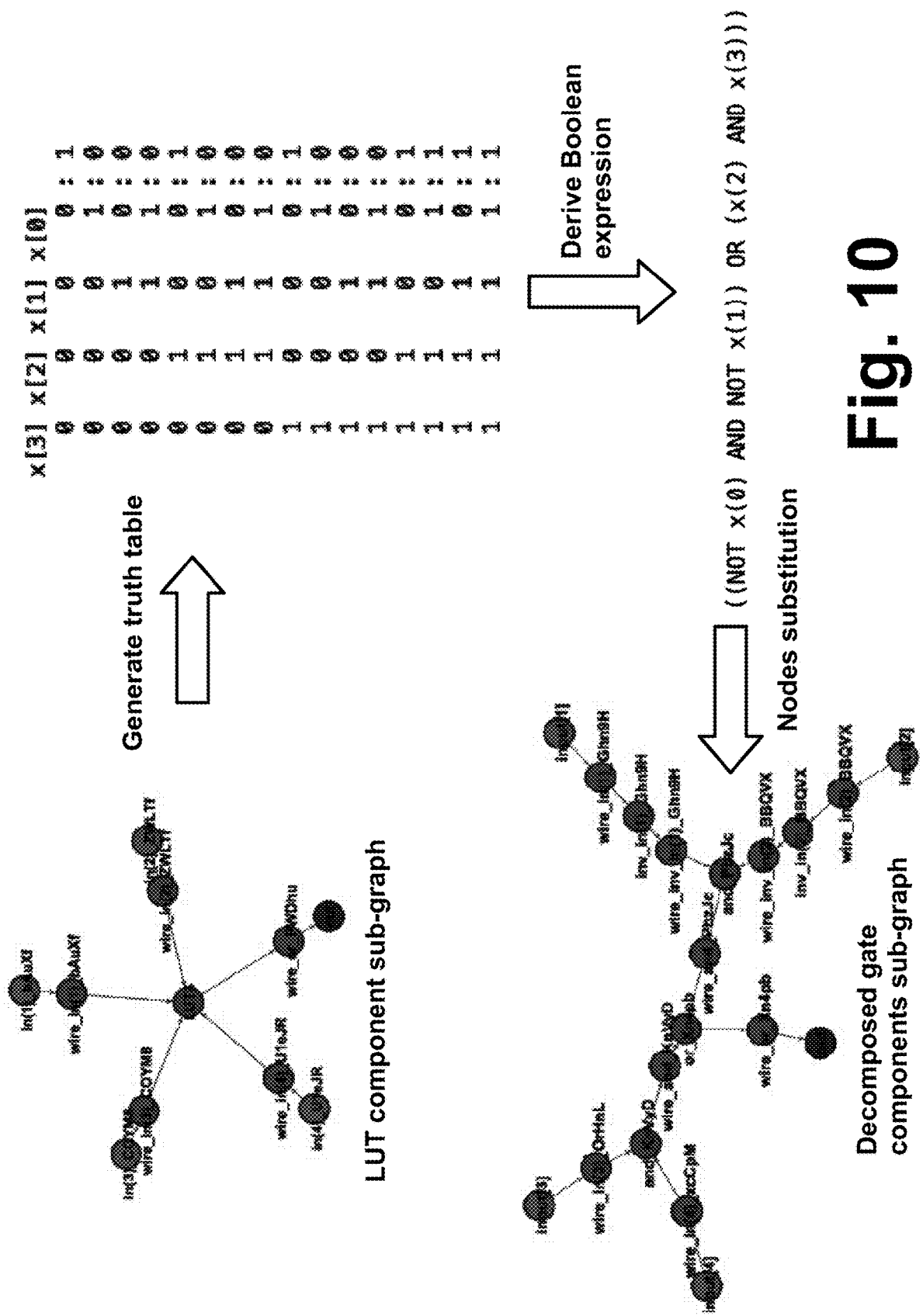

With continuing reference to FIG. 1 and with further reference to FIG. 10, in an operation 46, LUTs and primitives are decomposed. In general, higher-level components such as LUTs and higher level primitives compress structural information and make pattern recognition and structural identification more difficult. In the case of primitives, the IC nomenclature and primitives database 44 may be referenced to identify manufacturer-specific primitives and their decomposed equivalents consisting of logic gates and FFs (and possibly also LUTs). To decompose a LUT, a process as shown in FIG. 10 is suitably employed. The LUT initialization vectors (which define the LUT output for any combination of inputs) is represented as a truth table having columns corresponding to the inputs and a final column corresponding to the LUT output. The truth table is expanded into an equivalent simplified Boolean expression that is minimized by standard minimization techniques such as identifying and merging groups of inputs with a common output value. The simplified Boolean expression is then represented as a subgraph with instance nodes representing the logic gates of the Boolean expression. A subgraph that includes a LUT node is thereby replaced with a standardized subgraph that does not include a LUT node. It should be noted that the illustrative LUT decomposition of FIG. 10 is for an FPGA. In the case of an ASIC, LUT decomposition is typically not performed; whereas, for an FPGA the LUT decomposition facilitates obtaining a useful graph from the netlist. More generally, higher-order functionality can typically be recovered more quickly from an FPGA netlist (as compared with an ASIC) when onboard hardware of the FPGA cells (such as adders or multipliers) is used instead of synthesizing this functionality into logic cells.

The output of the operation 46 is a standardized graph 50, which is a fully directed graph and which employs standardized nomenclature, and which has LUTs and higher level primitives decomposed into subgraphs consisting of logic gate instance nodes and (usually) FF instance nodes. The standardized graph 50 consists of basic logic nodes (e.g. AND, OR, NOT) and FF nodes, in addition to input and output terminal nodes and constant signal source nodes (see FIG. 5).

With reference to FIG. 2, the standardized graph 50 is used to recover the RTL representation of the netlist 20. The structure of the standardized graph 50 lends itself well to creating an RTL representation in VHDL code or another HDL such as Verilog or SystemVerilog, as each wire node is analogous to a VHDL 'signal' (or, equivalently, a Verilog or SystemVerilog 'signal'), as it has one driver and unlimited outputs (that is, a single input signal and one or more output signals, wherein the value of each output signal is equal to the value of the single input signal). Hence, an operation 60 builds VHDL signal declarations from the wire nodes of the standardized graph 50. That is, signals are declared for each wire node. An operation 62 builds signal assignments from instance nodes. Signal states are assigned to logical operations on other signals and design inputs.

However, some standard cells and FPGA primitives do not have simple gate-level equivalents. Some examples include: multiplication stages, RAM, ROM, or so forth. The use of these primitives is useful for determining hierarchy, but is not advantageous for simulation. Additionally, many slight variations of simple components like flop-flops exist, e.g. active high vs active low, bus width, inclusion of set/reset ports, a/synchronous set/reset, and so forth.

To address these situations, an operation 64 defines synchronous devices from templates. In an illustrative embodiment, rather than code simulation primitives for every case, a modular template system is employed, which makes use of a template VHDL library 66 of VHDL 'Generics' and enables or disables functionality as appropriate for a given standard cell or FPGA primitive. The information from the template VHDL library 66 is stored in nodes during classification. A component-to-template map 68 provides manufacturer- or device family-specific information as to the modifications to the VHDL template standard cell or FPGA primitive appropriate for the specific IC whose RTL representation is being recovered. An operation 70 instantiates and connects the synchronous logic. Each node corresponding to a standard cell or FPGA primitive in the standardized graph 50 is represented in the VHDL code by an instance of the synchronous device primitive defined in the operation 64, with connections to the surrounding circuitry of that node in the standardized graph 50. This introduces some hierarchy into the RTL representation. An operation 72 then introduces (further) hierarchy to the RTL for repeated structures. An operation 74 writes the RTL to a VHDL file 76, thus completing the RTL recovery process. It should be noted that while VHDL is employed in FIG. 2 as an illustrative Hardware Description Language (HDL), the RTL may be coded in accord with another HDL such as Verilog or SystemVerilog by employing the appropriate Declarations notation for the chosen HDL in coding operations 60, 62 and a template library and mapping for the chosen HDL in place of the illustrative template VHDL library 66 and mapping 68, respectively.

Figure 12:
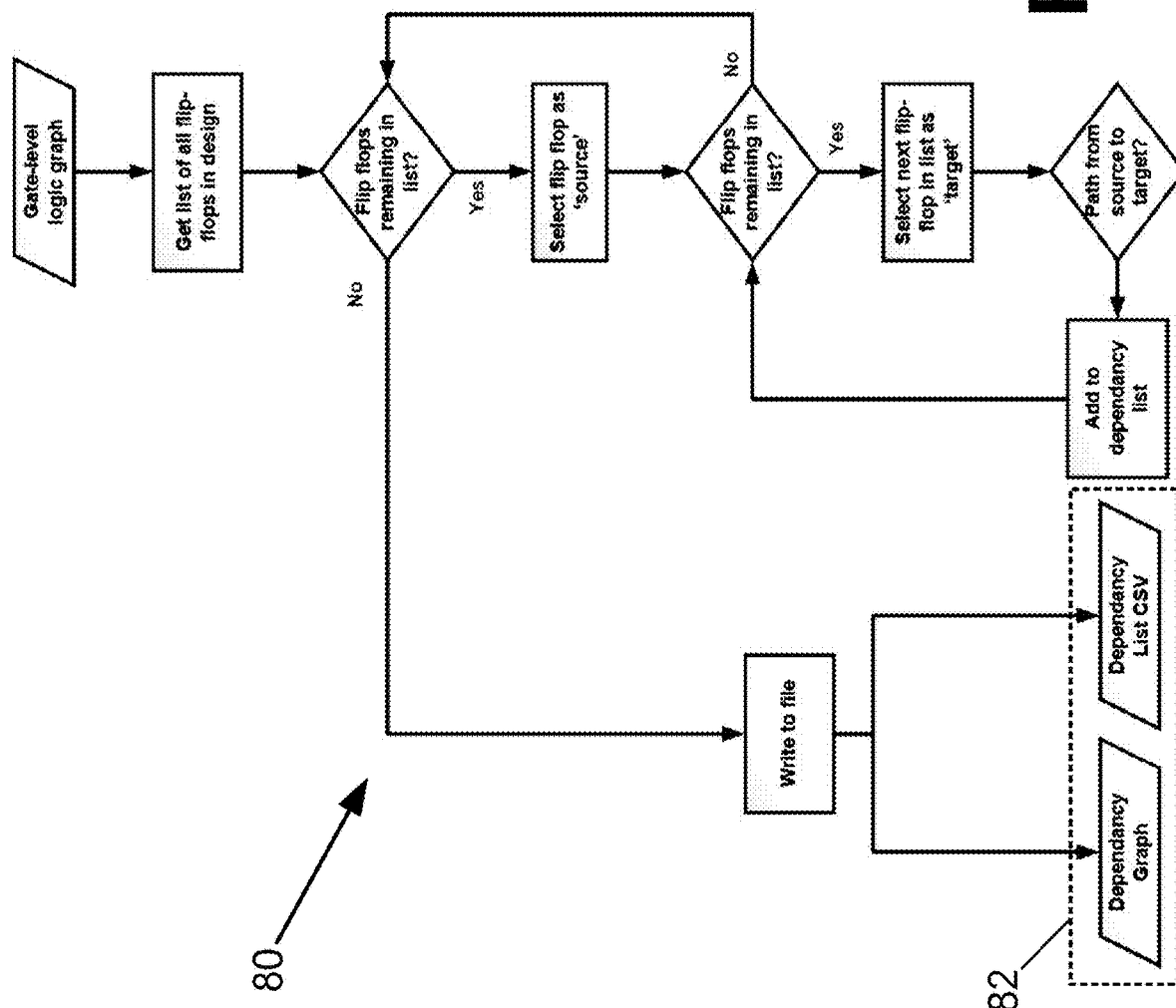

With continuing reference to FIG. 2 and with further reference to FIGS. 11-13, the operation 72 introducing (further) hierarchy to the RTL for repeated structures can be implemented in various ways. The structure of the standardized graph 50 lends itself well to structural identification of components. Identified repeated structures can be replaced by a single higher-level structural declaration in the HDL, and then instances of the structure can be replaced by instantiations of the declared higher level structure. FIG. 11 illustrates an example of this approach, in which a graph of an 8-bit counter is identified (i.e. matched) as a sub-graph of a graph of a Central Processing Unit (CPU) integrated circuit. It is particularly noteworthy here that the 8-bit counter graph includes an outer loop of flip-flop dependencies (shown in darker lines in the graph for the 8-bit counter. This graph topological feature can be leveraged in identifying the 8-bit counter sub-graph in the CPU graph (sub-graph depicted in lighter lines in the lower right diagram of FIG. 11).

With continuing reference to FIG. 2 and with further reference to FIG. 12, another way to leverage the standardized graph 50 for identifying hierarchical structures in the operation 72 is by way of simulation. Combinational logic processing can be simulated by assigning signal values to selected wire nodes and simulating the result. In this way, components such as adders can be identified by simulating combinational logic chunks between flip-flops. More generally, frequent patterns identified from graph mining can be simulated and compared to a list of known components. Again, identifying flip-flop interdependencies can be useful in identifying repeated patterns. FIG. 12 illustrates a flowchart of a method 80 for identifying flip-flop dependencies, which can be used to create a reduced graph 82 of flip-flop interdependencies for the pattern mining. The reduced graph 82 produced by the method 80 contains each flip-flop in the netlist represented as a vertex. The logical path from each flip-flop to the others (if one exists) is represented as an edge. The reduced graph 82 of flip-flop dependencies is useful for reducing the computation required to identify patterns such as state machines. For example, as previously noted the 8-bit counter of FIG. 11 can be identified by searching for the circular dependencies of the eight flip-flops of the counter. The method 80 of FIG. 12 would advantageously provide a reduced graph 82 isolating these flip-flop interdependencies. More generally, state machines contain a set of flip-flops with outputs that feedback through combinatorial logic to the flip-flop inputs. The combinatorial logic in the feedback path along with the state machine inputs make up the next state expression. The reduced flip-flop graph 82 can be used with graph searching techniques to quickly identify the sets of flip-flops that meet these criteria.

With continuing reference to FIGS. 2 and 12 and with further references to FIG. 13, using the reduced flip-flop graph output by the method of FIG. 12, a strongly connected components search can be performed that, in the directed graph (i.e. edges between vertices of the reduced graph of flip-flop dependencies have directionality), will identify all sets of flip-flops that collectively feedback to each other. These flip-flops, in many cases, combine to make up memory that stores the state variables of a state machine. FIG. 13 illustrates a flow diagram of a method for state machine extraction from an ASIC netlist 20 according to this approach. (Note, in FIG. 13 flip-flops are referred to as "registers"). In FIG. 13, the processing described with reference to FIG. 1 for producing the standardized graph 50 shown in the left branch of FIG. 13 is represented in FIG. 13 by blocks 90, 92, while the process 80 for producing the reduced graph 82 of flip-flop (i.e. register) dependencies is shown in the right branch of FIG. 13. Operation 94 is the "strongly connected components" search. A loop 96 selects strongly connected components with between 1 and 100 component vertices in the reduced flip-flop graph 82 as possible state machines. (This range of 1-100 is merely illustrative, and may be tuned to maximize performance for a particular family of ICs undergoing RTL recovery). For each possible state machine (i.e. each sub-graph of the reduced graph 82), a process 98 retrieves the corresponding sub-graph of the standardized graph 50 (this sub-graph will include the interconnecting combinational logic of the possible state machine), generates the state transition tables for the sub-graph of the standardized graph 50, and produces behavioral-level HDL code representing the state transition tables.

The illustrative RTL recovery methods can be incorporated into various types of IC analysis tools. For example, with reference back to FIGS. 1 and 2, a graphical user interface (GUI) may be provided via which the netlist 20 is provided as input to the RTL representation recovery method, for example by selecting a text file containing the netlist using the mouse 18 to navigate a file manager to select the netlist file. The RTL representation recovery method then generates the RTL representation 76 of the netlist, and the user selects a portion of the RTL representation 76 to view on the display 14. If IC performance simulation software is also provided, the user may perform simulations on the netlist 20 and the RTL representation 76 to verify that they exhibit the same functionality. An extracted netlist from an IC could range from tens of thousands of lines long for a simple design up to several million lines for a reasonably complex design. As such, navigating through the flat netlist to identify areas of assurance concern is not practical for a human to perform. Understanding the functionality or locating portions of the design is also not realistic or feasible. By representing the netlist with as recovered RTL with hierarchy and in a more condensed and readable format, a user can more readily identify and understand the regions of interest to determine if the design was modified to alter design functionality. In another application, engineers who are addressing legacy part problems may need to extract the design in order to remanufacture it into a modern technology node. For example, a design that was fabricated in a 500 nanometer technology node, an obsolete technology not readily available today, could be fabricated in a 90 or 45 nanometer technology. In order to perform this, an RTL representation of the design is obtained using the disclosed RTL recovery in order for the designer to resynthesize into the modern node size. A netlist typically cannot be remanufactured; hence the extracted legacy netlist is generally not sufficient to remanufacture the IC. By contrast, the disclosed RTL recovery allows the legacy netlist to be converted into a format that permits resynthesizing into the modern node, thus saving large amounts of resources on a complete redesign of the component.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method of recovering a functional representation of an integrated circuit (IC), the method comprising:
   generating a flattened netlist representing the IC by physical examination of the IC; and
   using an electronic processor, converting the flattened netlist to a hierarchical functional representation of the IC, wherein the converting of the flattened netlist to the hierarchical functional representation of the IC includes identifying flip-flop interdependencies and identifying a state machine defined by a set of the flip-flops with outputs that feedback through combinatorial logic to the flip-flop inputs.

2. The method of claim 1, wherein the generating of the flattened netlist representing the IC by physical examination of the IC includes reverse engineering the flattened netlist based on outputs generated by the IC in response to test inputs to the IC.

3. The method of claim 2, wherein the IC comprises a field programmable gate array (FPGA).

4. The method of claim 1, wherein the generating of the flattened netlist representing the IC by physical examination of the IC includes performing scanning electron microscope (SEM) imaging of the IC.

5. The method of claim 1, wherein the converting of the flattened netlist to the hierarchical functional representation of the IC includes identifying repeated structures and replacing the repeated structures with a hierarchical representation of the repeated structures.

6. The method of claim 1, wherein the converting of the flattened netlist to the hierarchical functional representation of the IC includes:
   converting the flattened netlist to a register transfer language (RTL) representation of the IC.

7. The method of claim 6, wherein the converting of the flattened netlist to the hierarchical functional representation of the IC further includes defining instances of synchronous devices of the IC based on RTL templates of the synchronous devices.

8. The method of claim 6, further comprising:
   using the electronic processor and a display, providing a graphical user interface (GUI) via which a portion of the RTL representation of the IC is selected and displayed.

9. The method of claim 6, further comprising:
   using the electronic processor, performing an IC performance simulation on the flattened netlist representing the IC;
   using the electronic processor, performing an IC performance simulation on the RTL representation of the IC; and
   using the electronic processor, comparing the IC performance simulation on the flattened netlist representing the IC and the IC performance simulation on the RTL representation of the IC.

10. The method of claim 1, wherein the IC comprises an application-specific integrated circuit (ASIC).

11. The method of claim 1, further comprising:
    using the hierarchical functional representation of the IC, manufacturing a new IC in a different technology node than the IC.

12. A method of recovering a functional representation of an integrated circuit (IC), the method comprising:
    generating a flattened netlist representing the IC by physical examination of the IC; and
    using an electronic processor, converting the flattened netlist to a register transfer language (RTL) representation of the IC;
    using the electronic processor, performing an IC performance simulation on the flattened netlist representing the IC;
    using the electronic processor, performing an IC performance simulation on the RTL representation of the IC; and
    using the electronic processor, comparing the IC performance simulation on the flattened netlist representing the IC and the IC performance simulation on the RTL representation of the IC.

13. The method of claim 12, further comprising:
    using the hierarchical functional representation of the IC, manufacturing a new IC in a different technology node than the IC.

14. A method of recovering a functional representation of an integrated circuit (IC), the method comprising:
    generating a flattened netlist representing the IC by physical examination of the IC; and
    using an electronic processor, converting the flattened netlist to a register transfer language (RTL) representation of the IC;
    converting the RTL representation of the IC to a different technology node than the technology node of the IC; and
    manufacturing a new IC in the different technology node using the RTL representation of the IC converted to the different technology node.

* * * * *